(12) United States Patent
Boyd et al.

(10) Patent No.: US 12,473,089 B2
(45) Date of Patent: Nov. 18, 2025

(54) PORTABLE ELECTRONIC DEVICE HOLDER WITH SOCKET AND ROTATING PARTIAL-CYLINDER

(71) Applicant: B/E Aerospace, Inc., Winston-Salem, NC (US)

(72) Inventors: Michael Boyd, Kernersville, NC (US); Travis J. Vaninetti, Bothell, WA (US); Mauricio Santiago, Redmond, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 245 days.

(21) Appl. No.: 18/215,421

(22) Filed: Jun. 28, 2023

(65) Prior Publication Data
US 2025/0002152 A1    Jan. 2, 2025

(51) Int. Cl.
| | |
|---|---|
| *B64D 11/00* | (2006.01) |
| *B60R 11/02* | (2006.01) |
| *B60R 11/00* | (2006.01) |
| *B64D 11/06* | (2006.01) |

(52) U.S. Cl.
CPC .... *B64D 11/00152* (2014.12); *B60R 11/0241* (2013.01); *B60R 2011/0017* (2013.01); *B60R 2011/0071* (2013.01); *B60R 2011/0085* (2013.01); *B64D 11/0638* (2014.12)

(58) Field of Classification Search
CPC .......................... B60N 3/004; B60R 2011/0015
USPC ............. 108/44; 297/188.04, 188.05, 188.01
See application file for complete search history.

(56) References Cited

U.S. PATENT DOCUMENTS

| | | | | |
|---|---|---|---|---|
| 5,267,775 A | * | 12/1993 | Nguyen | B60R 11/0235 297/217.3 |
| 5,507,556 A | * | 4/1996 | Dixon | B60R 11/0235 D14/371 |
| 8,210,605 B2 | * | 7/2012 | Hough | B60R 11/0252 297/188.05 |
| 8,708,298 B2 | | 4/2014 | Hu et al. | |
| 8,899,537 B2 | | 12/2014 | Kuan et al. | |
| 10,703,482 B1 | | 7/2020 | Puglisi et al. | |
| 11,772,797 B2 | * | 10/2023 | Maurmaier | G09F 21/08 297/163 |

(Continued)

FOREIGN PATENT DOCUMENTS

| | | | | |
|---|---|---|---|---|
| DE | 20205235 U1 | * | 6/2002 | ........... G06F 1/1628 |
| WO | 2018151664 A1 | | 8/2018 | |

OTHER PUBLICATIONS

European Search Report received in EP Application No. 24184788. 8, Dec. 9, 2024, 8 pages.

*Primary Examiner* — Jose V Chen
(74) *Attorney, Agent, or Firm* — Suiter Swantz IP

(57) ABSTRACT

A portable electronic device (PED) holder for being mounted to a structure such as a passenger seat backrest. In embodiments, the PED holder includes a socket, a hollow partial-cylinder rotatably disposed in the socket, and an adjustable clamp mounted in the hollow partial-cylinder. The hollow partial-cylinder and the socket interact via a guide mechanism configured to control rotation of the hollow partial-cylinder relative to the socket. In embodiments, the adjustable clamp is mounted to a base and includes first and second arms, at least one of which is spring-loaded. In some embodiments, an electromagnetic induction coil may be disposed in the base.

16 Claims, 7 Drawing Sheets

(56) References Cited

U.S. PATENT DOCUMENTS

| | | | | |
|---|---|---|---|---|
| 11,787,321 B2* | 10/2023 | Inagaki | ............ | B60R 16/03 |
| | | | | 297/362 |
| 2001/0002092 A1* | 5/2001 | Reitze | ............ | B60Q 3/57 |
| | | | | 297/217.6 |
| 2006/0175882 A1* | 8/2006 | Schweizer | ............ | B60N 3/004 |
| | | | | 297/146 |
| 2015/0108798 A1* | 4/2015 | Boyer, Jr. | ............ | B60R 11/0252 |
| | | | | 297/188.05 |
| 2015/0175265 A1* | 6/2015 | Thiele | ............ | B64D 11/06 |
| | | | | 297/188.04 |
| 2015/0367787 A1* | 12/2015 | Dueser | ............ | B60N 2/879 |
| | | | | 297/188.05 |
| 2016/0009394 A1* | 1/2016 | Felske | ............ | B64D 11/0638 |
| | | | | 297/163 |
| 2016/0264244 A1 | 9/2016 | Matsumoto | | |
| 2016/0355263 A1 | 12/2016 | Pozzi et al. | | |
| 2017/0259752 A1* | 9/2017 | Guzman Colin | ... | B60R 11/0252 |
| 2018/0178699 A1* | 6/2018 | Oh | ............ | B60N 3/001 |
| 2018/0222400 A1 | 8/2018 | Neumann et al. | | |
| 2019/0283644 A1* | 9/2019 | Smith | ............ | B60N 3/102 |
| 2020/0148081 A1* | 5/2020 | Marais | ............ | B64D 11/00152 |
| 2021/0039793 A1* | 2/2021 | Vipula | ............ | B64D 11/00155 |
| 2022/0118893 A1* | 4/2022 | Line | ............ | B60N 2/80 |
| 2022/0173615 A1 | 6/2022 | Wright | | |
| 2023/0039693 A1 | 2/2023 | Dessapt et al. | | |
| 2023/0219477 A1* | 7/2023 | Escobar | ............ | B60N 3/002 |
| | | | | 297/463.1 |
| 2023/0219688 A1* | 7/2023 | Lopez | ............ | B64D 11/0638 |
| | | | | 297/124 |
| 2024/0409221 A1* | 12/2024 | Zachäus | ............ | B60N 3/004 |

* cited by examiner

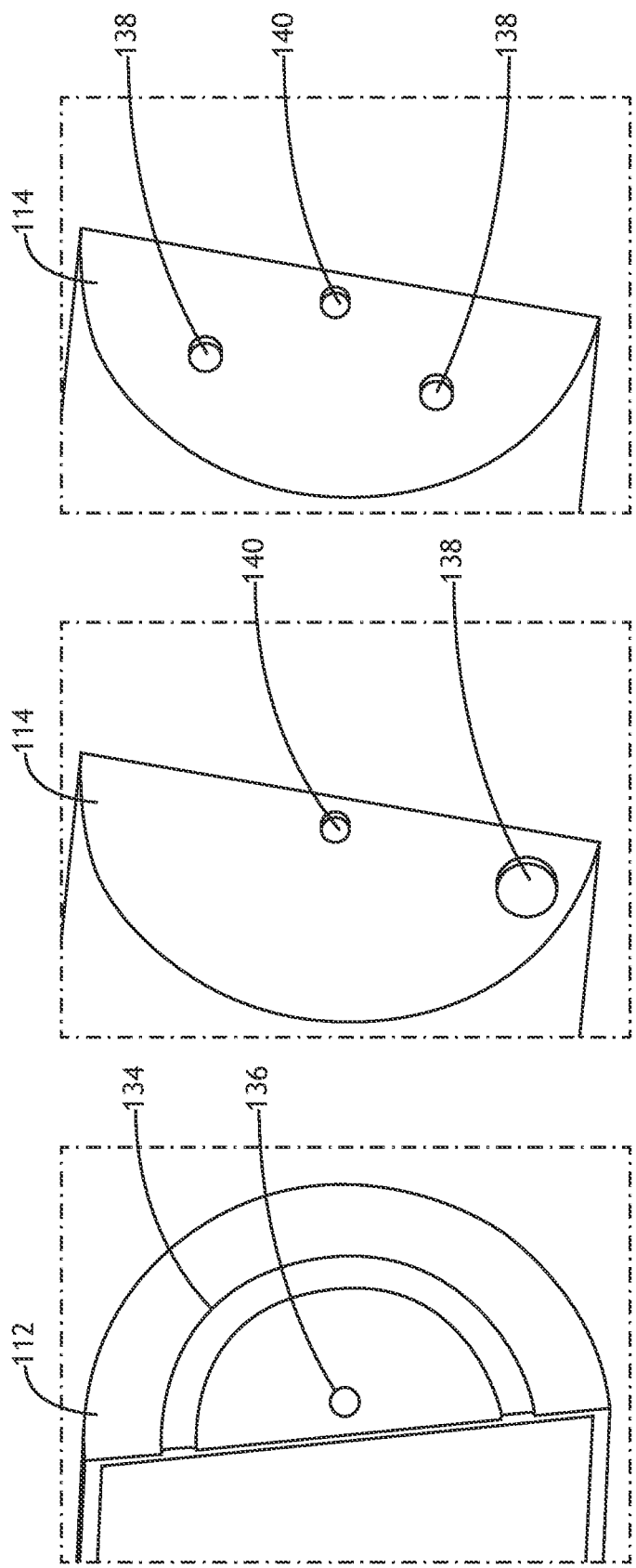

PORTABLE ELECTRONIC DEVICE HOLDER WITH SOCKET AND ROTATING PARTIAL-CYLINDER

TECHNICAL FIELD AND BACKGROUND

The present disclosure relates generally to portable electronic device (PED) holders for mounting to a structure such as backrest of a passenger seat, and more particularly, to a PED holder including a socket for mounting in a structure and a partial-cylinder rotatably disposed in the socket to provide an adjustable viewing angle for the PED.

Passenger seats in aircraft and other conveyances commonly serve as mounting locations for passenger amenities. For example, backrests may serve as a mounting location for video monitors, deployable tray tables, literature pockets, etc., for use by passengers in the next row.

A typical backrest configuration positions the video monitor near the top of the backrest at the optimal viewing height, the deployable tray table near the middle of the backrest at an ergonomic dining and working height, and the literature pocket near the bottom of the backrest at a height acceptable for occasionally stowing and retrieving items.

Backrests may also serve as a mounting location for PED holders. Current PED holder solutions typically include a latch releasably engaging a deployable shelf. In use, the latch is released to rotate the shelf open such that the PED can be placed on the shelf, and in some instances, held between the shelf and the latch. While suitable for holding a PED, the angle of the deployed shelf and positional relationship to the latch angles the device screen upward, which may not be a desirable viewing angle for some passengers. In addition, deployable PED holders must be stowed for safety during taxi, takeoff, and landing (TTOL).

Therefore, what is needed is a PED holder solution with further adjustment capabilities, and one that allows continued use during TTOL and in-flight.

BRIEF SUMMARY

In one aspect, embodiments of the inventive concepts disclosed herein are directed to a portable electronic device (PED) holder. In embodiments, the PED holder includes a socket, a hollow partial-cylinder rotatably disposed in the socket, and an adjustable clamp mounted in the hollow partial-cylinder. The hollow partial-cylinder and the socket interact by a guide mechanism configured to control rotation of the hollow partial-cylinder relative to the socket.

In at least some embodiments, the adjustable clamp includes opposing first and second arms, at least one of which is spring-loaded.

In at least some embodiments, the hollow partial-cylinder has a horizontal axis of rotation, and the first and second arms are configured for horizontal linear motion.

In at least some embodiments, the hollow partial-cylinder has a vertical axis of rotation and the first and second arms are configured for vertical linear motion.

In at least some embodiments, the PED holder further includes a base disposed in the hollow partial-cylinder, wherein the adjustable clamp is mounted to the front of the base.

In at least some embodiments, the PED holder further includes an electromagnetic induction coil disposed in the base.

In at least some embodiments, the guide mechanism includes a partial-circular guideway positioned on each end of the hollow partial-cylinder, and a guide positioned on each end of the socket, each guide configured to interact with its respective partial-circular guideway.

In at least some embodiments, the guide mechanism includes a partial-circular guideway positioned on each end of the socket, and a guide positioned on each end of the hollow partial-cylinder, each guide configured to interact with its respective partial-circular guideway.

In at least some embodiments, the socket includes a partial-cylindrical cavity formed by or mounted to a seat backrest, and the hollow-partial cylinder is positioned in tight-fitting engagement within the partial-cylindrical cavity.

In at least some embodiments, the hollow partial-cylinder includes an open front face and the adjustable clamp is mounted substantially flush with the open front face.

In at least some embodiments, the hollow partial-cylinder is configured to rotate up to about 45 degrees relative to the socket to adjust a viewing angle of a PED held by the adjustable clamp.

According to another aspect, embodiments of the inventive concepts disclosed herein are directed to a passenger seat backrest, for instance an economy class aircraft passenger seat backrest, including a deployable tray table, a backrest surround positioned above the deployable tray table, and a portable electronic device (PED) holder positioned in the backrest surround. In embodiments, the PED holder includes a socket mounted to or formed by the backrest surround, a hollow partial-cylinder rotatably disposed in the socket, and an adjustable clamp mounted in the hollow partial-cylinder, wherein the hollow partial-cylinder and the socket interact by a guide mechanism configured to control rotation of the hollow partial-cylinder relative to the socket.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 4A-C illustrate a guide mechanism for guiding rotation of the partial-cylinder of the PED holder, in accordance with example embodiments of this disclosure;

DETAILED DESCRIPTION

Figure 1:
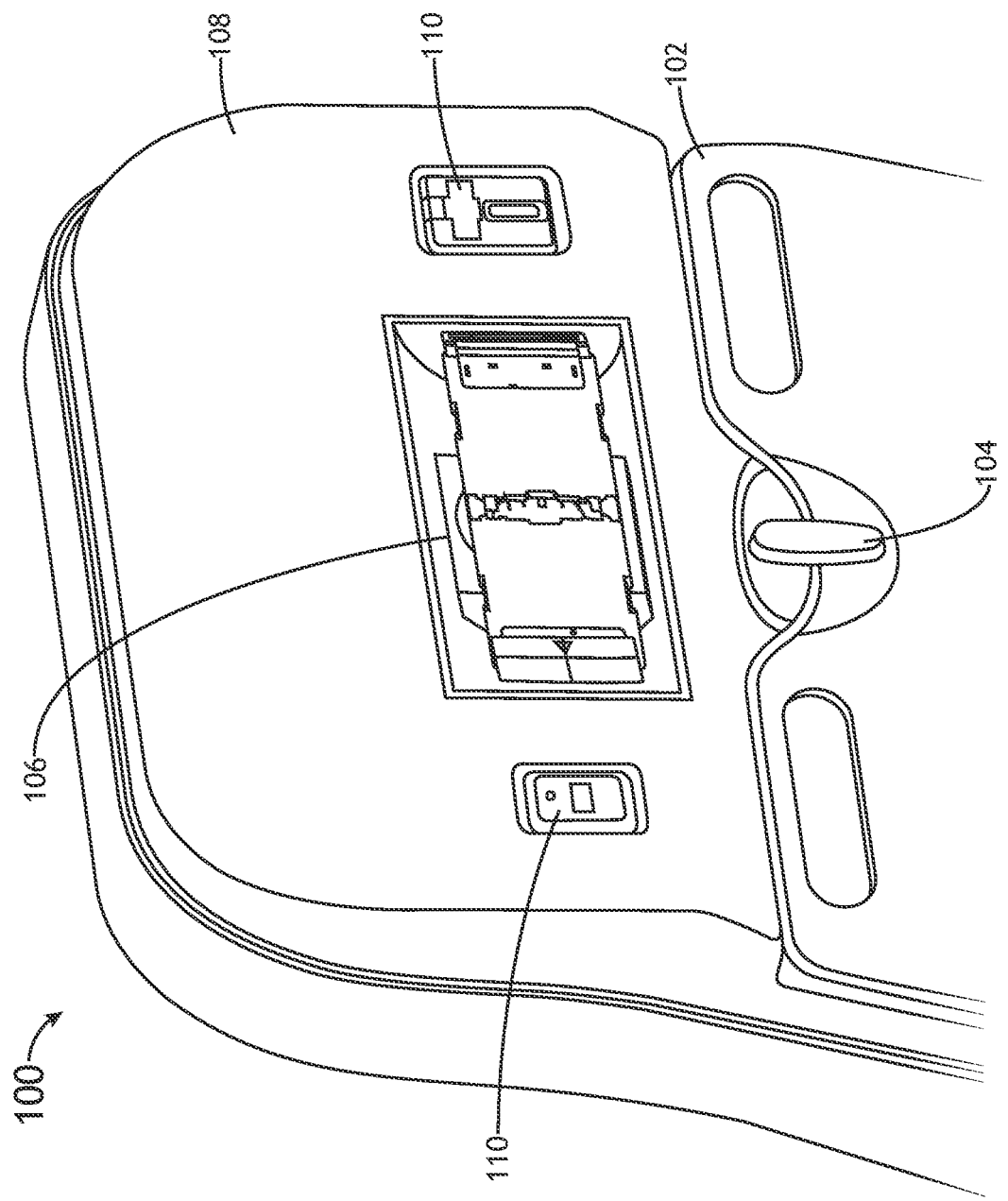
FIG. 1 is a perspective view of a seat backrest including a PED holder, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a PED holder for installation in an aircraft, other conveyance, or other location to facilitate hands-free viewing of a device such as a mobile phone. In embodiments, the PED holder may be scaled larger or smaller depending on the type of device(s) to be held. A non-limiting example of an installation location for the PED holder may include mounted to an aircraft passenger seat backrest for use by a passenger seated in the next row. Another non-limiting example of an installation location for the PED holder may include mounted to a wall, monument, or bulkhead positioned forward of a seat, such as a front row seat in a passenger cabin.

In use, the PED holder is configured to hold a portable electronic device in an adjustable clamp, wherein the adjustable clamp is mounted to a partial-cylinder, either directly or through an intermediate structure such as a base. In embodiments, the partial-cylinder is rotatably disposed in a socket mounted to or formed in a structure, for instance formed as part of a seat backrest. Depending on the axis of rotation of the partial-cylinder, the PED may be manipulated by hand to change the viewing angle of the device by rotating the partial-cylinder within the socket. As used herein, a "partial-cylinder" may include, but is not limited to, a semi-cylinder, less than half of a cylinder, and more than half of a cylinder. The partial-cylinder and the socket interact to control rotation of the partial-cylinder relative to the socket, which may be, for example, up to about 90 degrees, up to about 45 degrees, or up to about 30 degrees.

FIG. 1 illustrates a non-limiting example a seat backrest 100, for instance a recline-capable backrest forming part of an economy class airliner passenger seat. The seat backrest 100 includes a deployable tray table 102 held stowed with a latch 104. The PED holder 106 is positioned above the latch 104 at a more appropriate height on the seat backrest 100 for hands-free viewing of a PED, for instance a mobile phone, small tablet, etc. In some embodiments, the seat backrest 100 may include a monitor (not shown) positioned above the PED holder 106. The PED holder 106 is positioned in a backrest surround 108 that may form further portions of the seat backrest 100. As shown, the backrest surround 108 frames an opening for the PED holder 106 substantially centered on the seat backrest 100. The seat backrest 100 may further include power and data ports 110 positioned, as shown, on opposing lateral sides of the PED holder 106 to facilitate short cable runs to connected PEDs. In some embodiments, as discussed further below, a wireless charger may be located in the PED holder 106 to charge wireless charging enabled devices.

Figure 2:
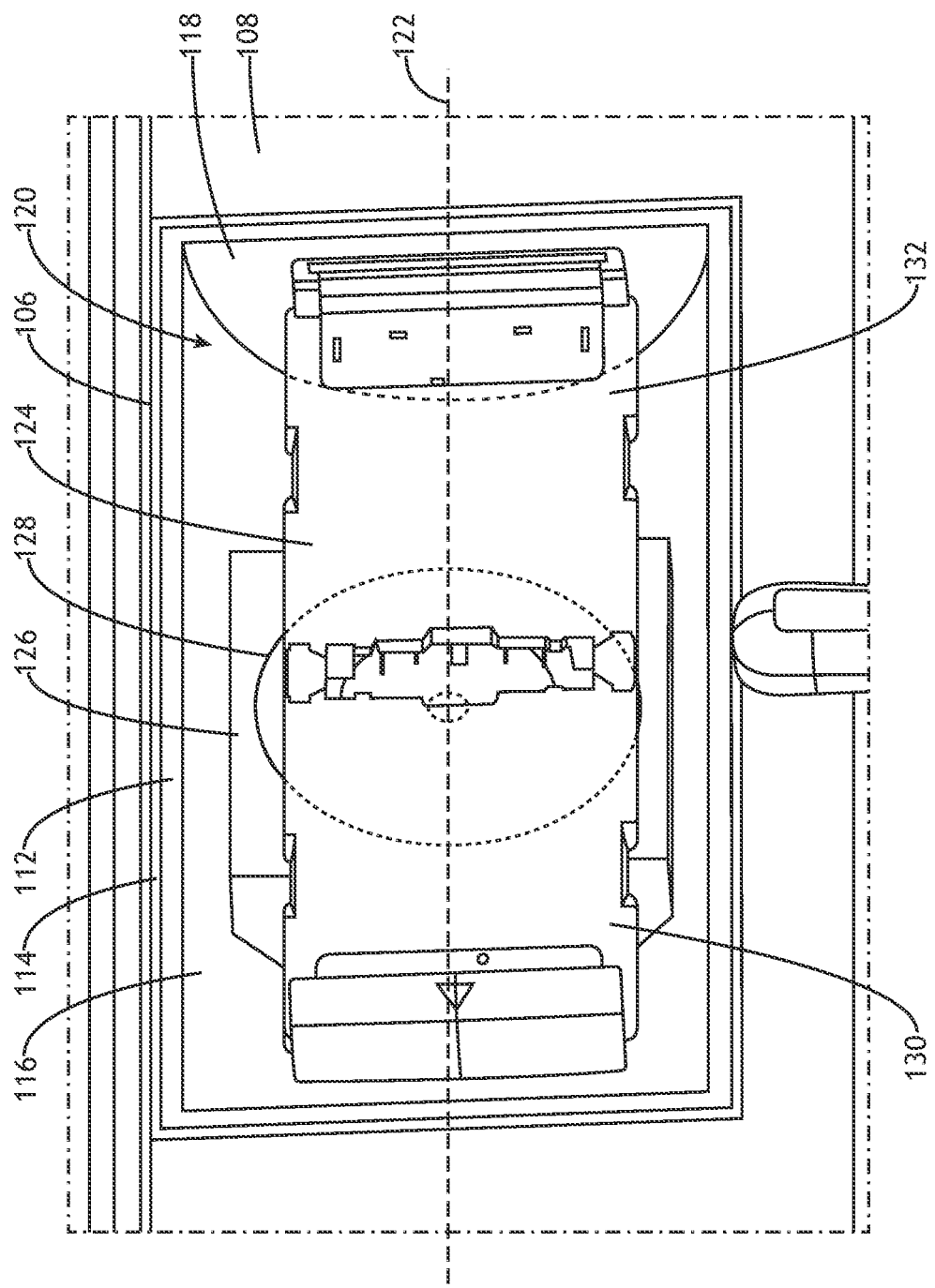
FIG. 2 is a detailed view of the PED holder, in accordance with example embodiments of this disclosure.

FIG. 2 further illustrates the PED holder 106 positioned in the backrest surround 108. The PED holder 106 generally includes a partial-cylinder 112 rotatably disposed in a socket 114. In some embodiments, the socket 114 is a separate structure mounted to the backrest. In other embodiments, the socket 114 may be integrally formed with the backrest surround 108. As used herein, the term "socket" generically refers to any structure defining a cavity configured to receive, engage, or otherwise interact with the rotating partial-cylinder 112. Examples of sockets include, but are not limited to, a housing defining a cavity having a corresponding cylindrical shape in which the partial-cylinder 112 rotates, plates defining a space therebetween configured to interact with the opposing ends of the partial-cylinder 112, a housing having a socket hole, etc.

As shown, the partial-cylinder 112 is a hollow semi-cylinder including an elongated cylindrical middle portion 116 and opposing ends 118 together defining an interior space 120. The interior space 120 is open at the front. As shown, the axis of rotation 122 of the partial-cylinder 112 is horizontal or substantially horizontal to rotate the partial-cylinder 112 to tilt the PED screen up or down. An adjustable clamp 124 is mounted in the interior space 120. As shown, the adjustable clamp 124 is mounted to a base 126 that is further mounted to the partial-cylinder 112. In some embodiments, an electromagnetic induction coil 128 is disposed within the base operable for charging wireless charging enabled devices.

In embodiments, the base 126 may be disposed entirely within the interior space 120 such that the adjustable clamp 124 may be positioned within, substantially flush with, or protruding slightly forward of the front opening of the partial-cylinder 112. Positioning the adjustable clamp 124 recessed within the interior space 120 may have the advantage of shielding the device screen from ambient light and other passengers, while positioning the forwardmost extent of the adjustable clamp 124 recessed relative to or flush with the front opening positions the device out of reach of head strike in the event of a sudden deceleration. As such, in some embodiments, the PED holder 106 does not stow and therefore may be used during TTOL depending on device usage regulations.

In embodiments, the adjustable clamp 124 includes opposing first and second arms 130, 132 each configured to grip or otherwise interact with a side or end of the held PED. At least one of the arms 130, 132 may be spring-loaded in the direction of the other arm to provide a constant compressive force to the PED. In some embodiments, the arms 130, 132 may be coupled through a spring-loaded rack-and-pinion mechanism such that the arms 130, 132 move together linearly in opposite directions. In use, the arms 130, 132 may be pulled apart to load the PED, and released such that the spring force of the adjustable clamp 124 acts to hold the PED.

Figure 3C:
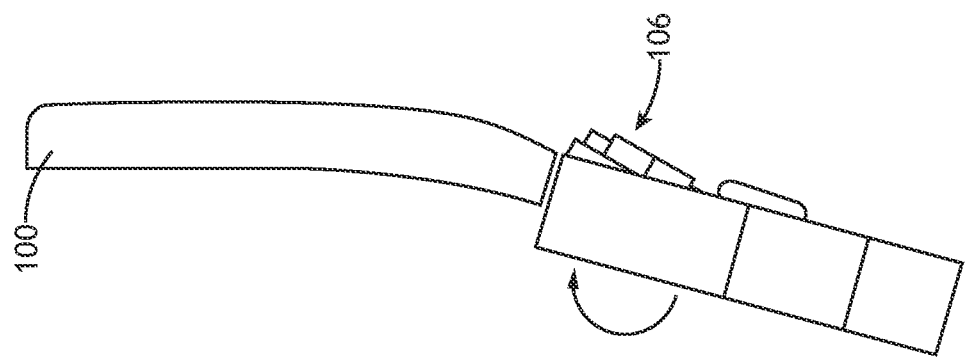
FIGS. 3A-C are side views of the seat backrest showing different viewing angles achievable with the PED holder, in accordance with example embodiments of this disclosure.
Figure 3B:
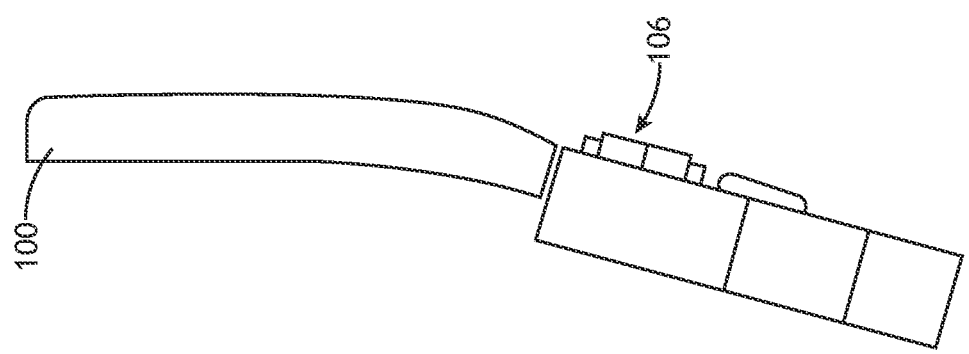
Figure 3A:
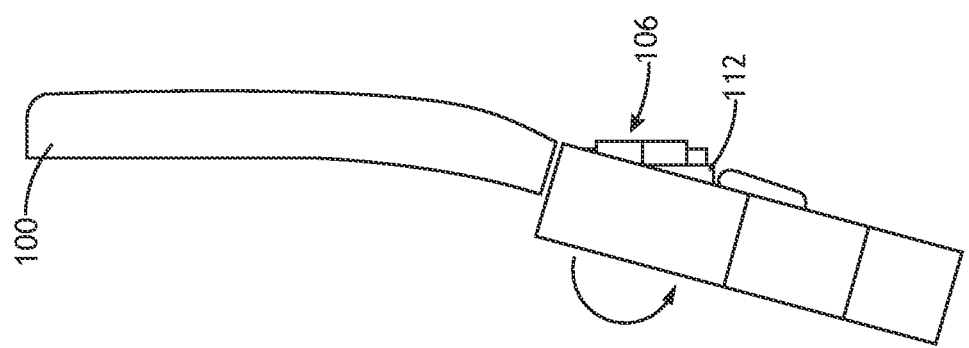

FIGS. 3A-C illustrate the seat backrest 100, position of the PED holder 106 relative to the seat backrest 100, and viewing angle adjustment capabilities of the PED holder 106. FIG. 3A shows the partial-cylinder 112 rotatable about a horizontal axis of rotation and rotated in a first direction to angle the PED screen "up." This direction of rotation and angle shown may be preferable when the seat backrest 100 is reclined or for those of taller stature. FIG. 3B shows the partial-cylinder 112 in a "neutral" position wherein the PED screen is substantially parallel to the surrounding portion of the seat backrest 100. FIG. 3C shows the partial-cylinder 112 rotated in a second direction opposite the first direction to angle PED screen "down." This angle may be preferable for children of those of smaller stature. In embodiments, depending on the configuration of the PED holder 106 and desired adjustment capabilities, the partial-cylinder 122 may rotate, between fully "up" and fully "down," up to about 90 degrees, more preferably up to about 45 degrees, and even more preferably up to about 30 degrees.

FIGS. 4A-C illustrate a first embodiment of a guide mechanism for controlling rotation of the partial-cylinder 112 relative to the socket 114. As shown in FIG. 4A, a guideway 134 is positioned, carried, formed, or otherwise provided on at least one end of the partial-cylinder. In embodiments, the guideway 134 is a curved track, such as a semi-circular track. A center pin locator 136 is also positioned, carried, formed, or otherwise provided concentric with the axis or rotation of the partial-cylinder 112. As shown in FIG. 4B, a guide 138 is positioned, carried, formed, or otherwise provided on the end of the socket 114 corresponding to the respective end of the partial-cylinder, and a center pin 140 is also positioned, carried, formed, or otherwise provided on the same end of the socket 114. In use, the center pin 140 rotates within the center pin locator 136, and the guide 138 interacts by traveling along the guideway 134 as the partial-cylinder rotates relative to the socket 114, for instance bearing against the guideway 134. In some embodiments, upper and lower stops may be provided for controlling the amount of rotation of the partial-cylinder 112 relative to the socket 114. FIG. 4C shows an alternative socket configuration including two guides 138 configured to travel along the guideway 134, wherein the "upper" guide 138 interacts with the "upper end" of the curved track to limit downward tilt of the PED screen and the "lower" guide 138 interacts with the "lower end" of the curved track to limit upward tilt of the PED screen. In embodiments, the guide mechanism may be symmetrical on both ends of the PED holder to maintain squareness and facilitate smooth rotation of the partial-cylinder 112 within the socket 114.

Figure 5A:
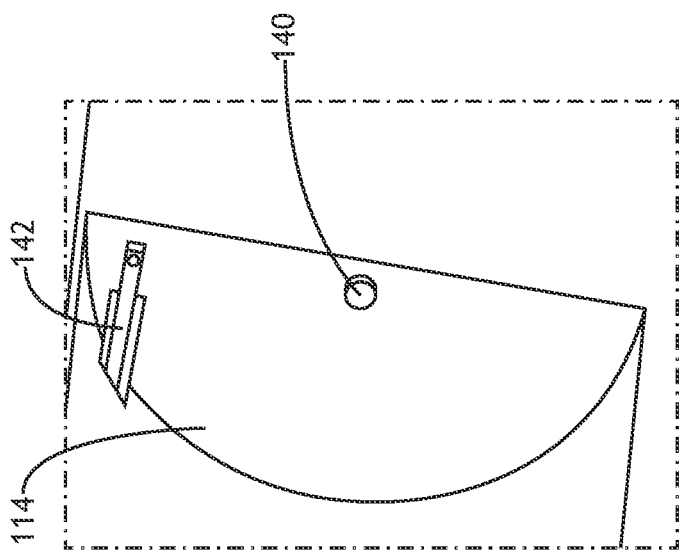
FIGS. 5A-C illustrate another guide mechanism for guiding rotation of the partial-cylinder of the PED holder, in accordance with example embodiments of this disclosure.
Figure 5B:
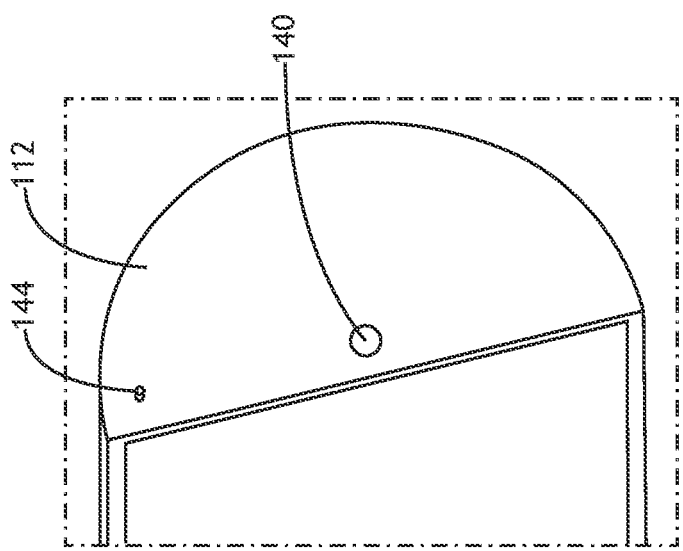
Figure 5C:
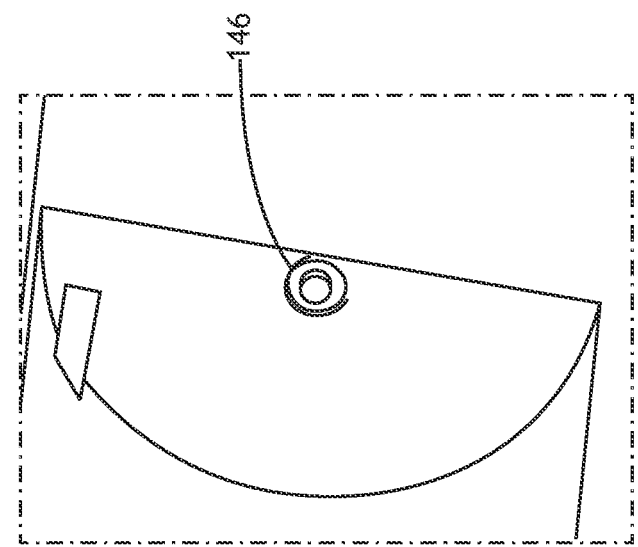

FIGS. 5A-C illustrate another version of the guide mechanism wherein at least one end of the socket 114 includes a center pin 140 as shown in FIG. 5A, the at least one corresponding end of the partial-cylinder 112 includes a center pin locator 136 as shown in FIG. 5B, at least one end of the socket 114 includes a guideway 142, and the corresponding at least one end of the partial-cylinder 112 includes a guide pin 144 configured to interact with the guideway 142. In embodiments, a clock spring 146 may be positioned concentric with the axis of rotation to bias the partial-cylinder 112 toward the neutral position.

Figure 6:
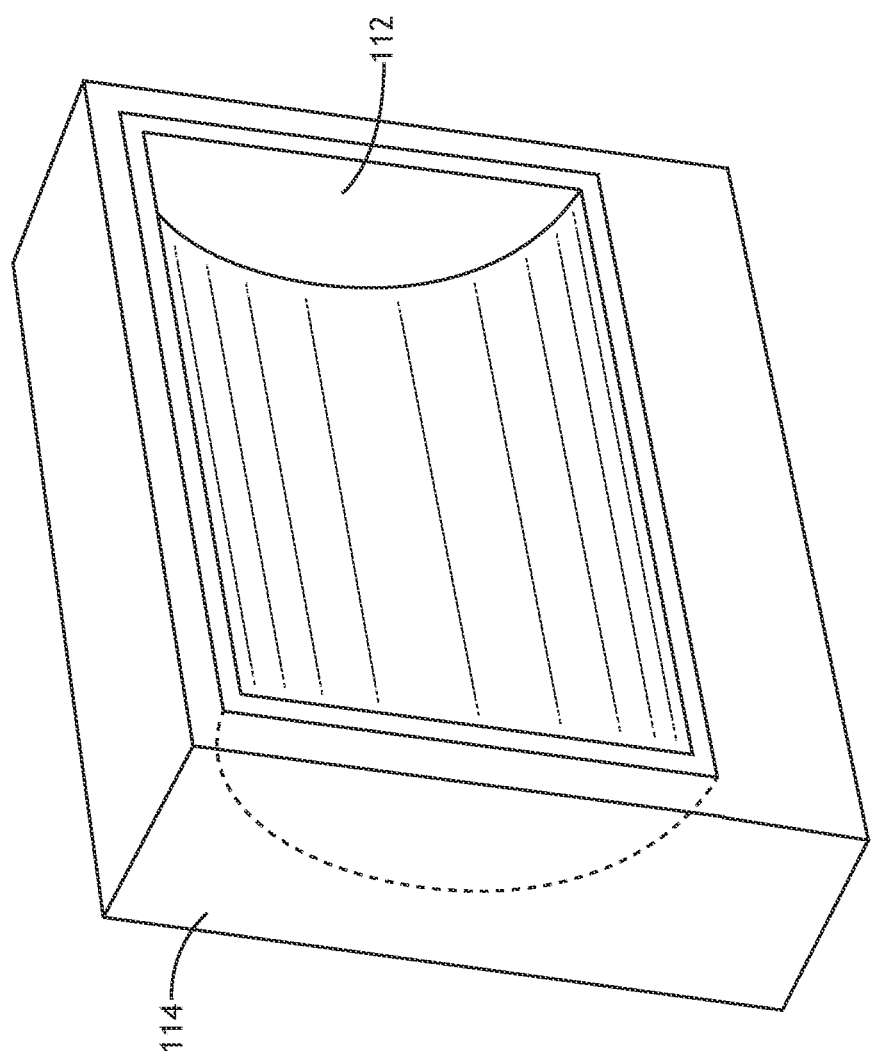
FIG. 6 illustrates a ball and socket style mechanism of the PED holder, in accordance with example embodiments of this disclosure.

FIG. 6 illustrates a ball-and-socket configuration in which the partial-cylinder 112 and socket 114 have corresponding cylinder shapes and the two parts are in tight-fitting engagement such that the partial-cylinder 112 is able to hold its position relative to the socket 114 without additional structure. In this configuration, the exterior of the partial-cylinder 112 interfaces with the interior of the socket 114 to form a rotatable joint. In some embodiments, the interface between the exterior and interior surfaces may include one or more features to provide frictional or other resistance to rotation of partial-cylinder 112 relative to socket 114, for instance dimples, scoring, ridging, etc. In addition, or in the alternative, the component materials may be chosen to have a relatively high coefficient of friction. Additional mechanisms for controlling rotation of the partial-cylinder 112 relative to the socket 114 include gears assemblies, roller assemblies, ratchet mechanisms, detents, etc.

Figure 7:
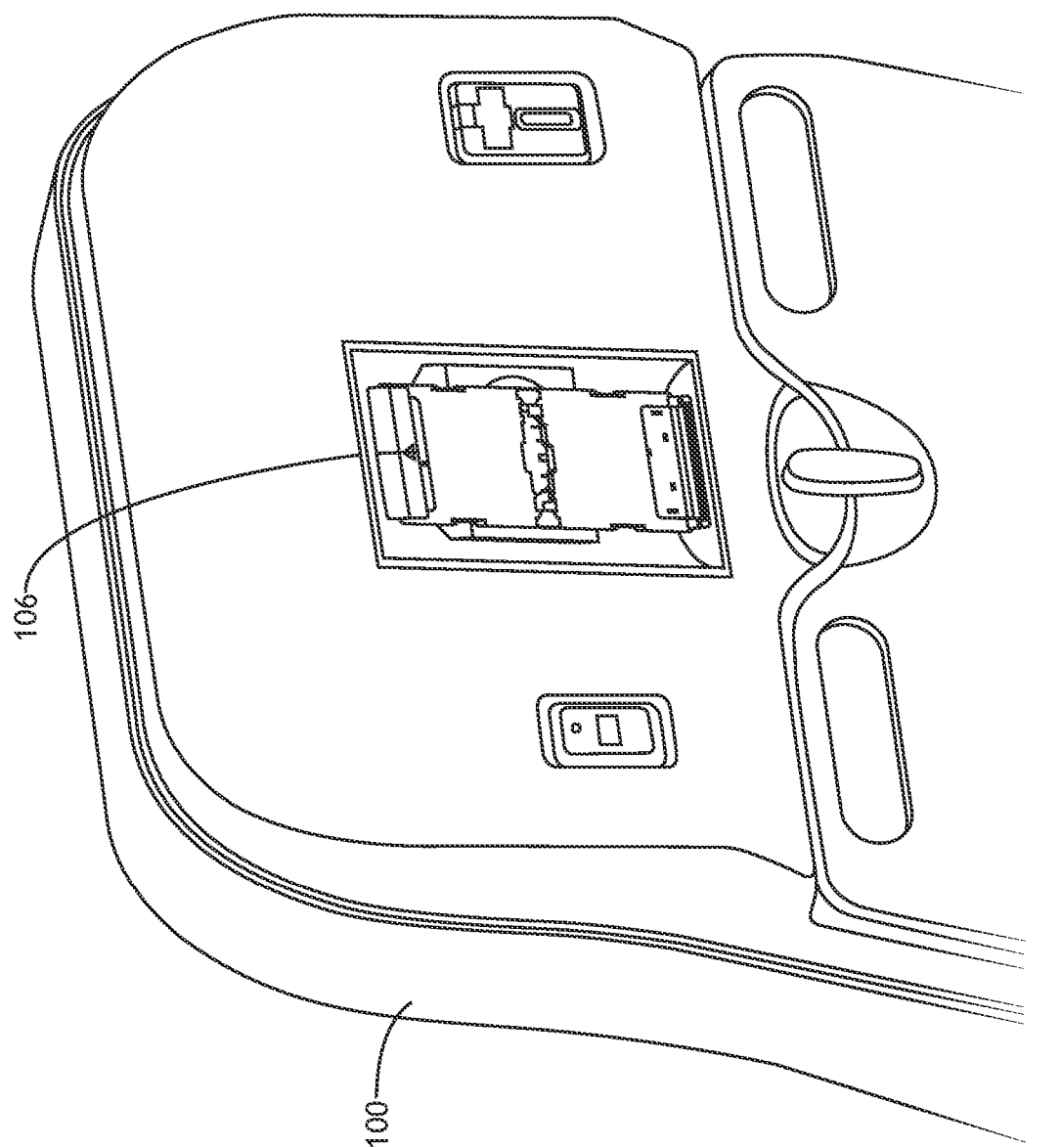
FIG. 7 is a perspective view of a seat backrest showing a vertical orientation of the PED holder, in accordance with example embodiments of this disclosure.

FIG. 7 illustrates an alternative orientation of the PED holder 106 in the seat backrest 100 wherein the axis of rotation is oriented vertically such that the PED screen can be selectively angled toward the left or the right as desired. Such an orientation may be desirable for sharing a screen between two passengers seated next to each other, for instance a parent traveling with a child or two children seated next to each other.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:
1. A portable electronic device (PED) holder, comprising:
a socket;

a hollow partial-cylinder rotatably disposed in the socket; and an adjustable clamp mounted in the hollow partial-cylinder;

wherein the hollow partial-cylinder and the socket interact by a guide mechanism configured to control rotation of the hollow partial-cylinder relative to the socket, the guide mechanism comprising:

a partial-circular guideway positioned on each end of the hollow partial-cylinder, and a guide positioned on each end of the socket, each guide configured to interact with the respective partial-circular guideway; or a partial-circular guideway positioned on each end of the socket, and a guide positioned on each end of the hollow partial-cylinder, each guide configured to interact with the respective partial-cylinder guideway.

2. The PED holder according to claim 1, wherein the adjustable clamp comprises opposing first and second arms, at least one of which is spring-loaded.

3. The PED holder according to claim 2, wherein the hollow partial-cylinder has a horizontal axis of rotation and the first and second arms are configured for horizontal linear motion.

4. The PED holder according to claim 2, wherein the hollow partial-cylinder has a vertical axis of rotation and the first and second arms are configured for vertical linear motion.

5. The PED holder according to claim 1, further comprising a base disposed in the hollow partial-cylinder, wherein the adjustable clamp is mounted to the base.

6. The PED holder according to claim 5, further comprising an electromagnetic induction coil disposed in the base.

7. The PED holder according to claim 1, wherein the socket comprises a partial-cylindrical cavity formed by or mounted to a seat backrest, and the hollow-partial cylinder is positioned in tight-fitting engagement within the partial-cylindrical cavity.

8. The PED holder according to claim 1, wherein the hollow partial-cylinder comprises an open front face and the adjustable clamp is mounted substantially flush with the open front face.

9. The PED holder according to claim 1, wherein the hollow partial-cylinder is configured to rotate up to about 45 degrees relative to the socket to adjust a viewing angle of a PED held by the adjustable clamp.

10. A passenger seat backrest, comprising:
a deployable tray table;
a backrest surround positioned above the deployable tray table; and
a portable electronic device (PED) holder positioned in the backrest surround, the PED holder comprising:
a socket mounted to or formed by the backrest surround;
a hollow partial-cylinder rotatably disposed in the socket; and
an adjustable clamp mounted in the hollow partial-cylinder;
wherein the hollow partial-cylinder and the socket interact by a guide mechanism configured to control rotation of the hollow partial-cylinder relative to the socket, the guide mechanism comprising:
a partial-circular guideway positioned on each end of the hollow partial-cylinder, and a guide positioned on each end of the socket, each guide configured to interact with the respective partial-circular guideway; or
a partial-circular guideway positioned on each end of the socket, and a guide positioned on each end of the hollow partial-cylinder, each guide configured to interact with the respective partial-cylinder guideway.

11. The passenger seat backrest according to claim 10, wherein the adjustable clamp comprises opposing first and second arms, at least one of which is spring-loaded.

12. The passenger seat backrest according to claim 11, wherein the hollow partial-cylinder has a horizontal axis of rotation and the first and second arms are configured for horizontal linear motion.

13. The passenger seat backrest according to claim 10, further comprising a base disposed in the hollow partial-cylinder and an electromagnetic induction coil disposed in the base, wherein the adjustable clamp is mounted to the base.

14. The passenger seat backrest according to claim 10, wherein the socket comprises a partial-cylindrical cavity and the hollow-partial cylinder is positioned in tight-fitting engagement within the partial-cylindrical cavity.

15. The passenger seat backrest according to claim 10, wherein the hollow partial-cylinder comprises an open front face and the adjustable clamp is mounted substantially flush with the open front face.

16. The passenger seat backrest according to claim 10, wherein the hollow partial-cylinder is configured to rotate up to about 45 degrees relative to the socket to adjust a viewing angle of a PED held by the adjustable clamp.

* * * * *